US010106438B2

(12) United States Patent
Chen

(10) Patent No.: US 10,106,438 B2
(45) Date of Patent: Oct. 23, 2018

(54) OIL-WATER SEPARATING STRUCTURE AND OIL-WATER SEPARATING SYSTEM USING THE SAME

(71) Applicant: Wen-Pin Chen, Miaoli County (TW)

(72) Inventor: Wen-Pin Chen, Miaoli County (TW)

(*) Notice: Subject to any disclaimer, the term of this patent is extended or adjusted under 35 U.S.C. 154(b) by 204 days.

(21) Appl. No.: 15/070,765

(22) Filed: Mar. 15, 2016

(65) Prior Publication Data

US 2016/0194220 A1  Jul. 7, 2016

Related U.S. Application Data

(63) Continuation-in-part of application No. 14/541,888, filed on Nov. 14, 2014, now abandoned.

(30) Foreign Application Priority Data

Nov. 15, 2013 (TW) .............................. 102141639 A

(51) Int. Cl.
*C02F 1/40* (2006.01)
*B01D 17/02* (2006.01)
*C02F 103/34* (2006.01)
*C02F 103/02* (2006.01)
*C02F 101/32* (2006.01)

(52) U.S. Cl.
CPC ............ *C02F 1/40* (2013.01); *B01D 17/0214* (2013.01); *C02F 2101/32* (2013.01); *C02F 2103/023* (2013.01); *C02F 2103/34* (2013.01)

(58) Field of Classification Search
CPC .. C02F 1/40; C02F 2103/34; C02F 2103/023; C02F 2101/32; B01D 17/0214; B01D 17/0208; B01D 35/05; B01D 35/027
See application file for complete search history.

(56) References Cited

U.S. PATENT DOCUMENTS

| 4,601,833 | A | | 7/1986 | Shubert | |
|---|---|---|---|---|---|
| 5,108,600 | A | * | 4/1992 | Rees | ................. E02B 15/108 210/242.3 |
| 5,601,705 | A | | 2/1997 | Glasgow | |
| 5,935,447 | A | * | 8/1999 | Febres | ............... B01D 17/0205 210/221.2 |
| 6,358,409 | B1 | | 3/2002 | Jabocy, Jr. et al. | |

FOREIGN PATENT DOCUMENTS

DE          19854317 A1 *  5/2000  ......... B01D 17/0214

OTHER PUBLICATIONS

Werner-DE-19854317 (original and translation attached) (Year: 2000).*

* cited by examiner

*Primary Examiner* — David C Mellon
*Assistant Examiner* — Liam Royce
(74) *Attorney, Agent, or Firm* — Muncy, Geissler, Olds & Lowe, P.

(57) ABSTRACT

An oil and water separating structure is provided. The oil and water separating structure mainly uses a pump to drive a fluid to form a jet flow in high flow velocity so as to produce a suction force. Oil floating on the water surface will be sucked into a tube and discharged along with the fluid. A mixed fluid discharged contains a high proportion of oil, so it is convenient to deal with the discharged oil. The oil and water separating structure can effectively separate oil from water.

3 Claims, 9 Drawing Sheets

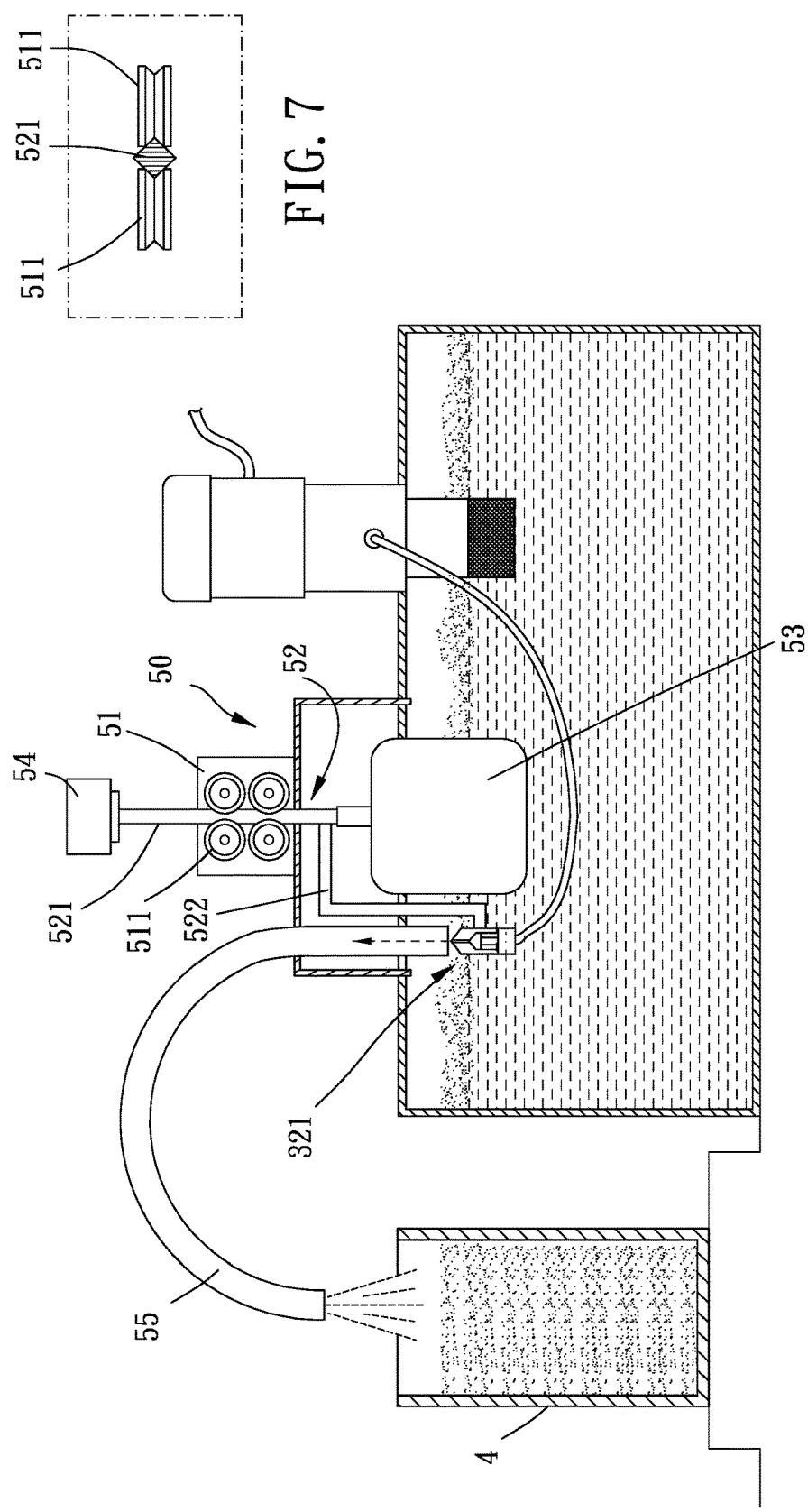

OIL-WATER SEPARATING STRUCTURE AND OIL-WATER SEPARATING SYSTEM USING THE SAME

The present invention is a CIP of application Ser. No. 14/541,888, filed Nov. 14, 2014, the entire contents of which are hereby incorporated by reference.

BACKGROUND OF THE INVENTION

Field of the Invention

Description of the Prior Art

It is ordinary for working machines to use lubricating oil or cutting oil in works to keep the working machines to work smoothly. Nevertheless, the cutting oil is primarily composed of cooling water and oil. When the cutting oil is processed in recycling, impurities are needed to be filtered and the oil and the water are needed to be separated. A common method of separating the water and the oil in prior art is to use a filtering cotton to absorb the oil on fluid surface and then recycle the water to use. However, the filtering cotton not only absorbs the cutting oil but also absorbs a large amount of the water. An efficiency of separating the oil and the water is low. The filtering cotton is also a problem after using and increases cost. Furthermore, some devices for separating the oil and the water are provided, for example, a structure driven by an electrical motor. The oil and the water can be separated and reused again, but the structure is complicated, has large volume and costs lots of power, so a performance of the device in prior art is limited and it costs too much.

U.S. Pat. No. 6,358,409 discloses that the entry tube 42, 46 of the pump is inserted in to the floating structure 10, and the exit tube 50, 52 of the pump is communicated to a second reservoir 58. That is, the entry tube 42, 46 is used to draw the mixed fluid in the first reservoir 72 but not to jet the mixed fluid out of the first reservoir 72. This device must require a one-end-opened tubular member fixed on the floating structure 10 and for receiving the entry tube 42 (which is contrary to the jetting mechanism of the present invention); otherwise, the oil on the water cannot be drawn and removed. Besides, the relative movement of the entry tube 42 and the one-end-opened tubular member is limited since the entry tube 42 and the one-end-opened tubular member can slid to detach from each other. That is, this structure cannot be sufficiently applied to fluid with lower surface level. Additionally, U.S. Pat. No. 6,358,409's device cannot provide for communicating with an external device which uses the fluid in the first reservoir 72.

The present invention has arisen to mitigate and/or obviate the afore-described disadvantages.

SUMMARY OF THE INVENTION

The primary object of the present invention is to provide an oil and water separating structure which works with a high efficiency.

To achieve the above object, an oil and water separating system is provided, including: a first reservoir, having a first receiving space for containing a mixed fluid of oil and water; a pump, disposed at least partly in the first receiving space of the first reservoir, wherein the pump is fixedly disposed on the first reservoir and operable to suck the mixed fluid of oil and water from the first reservoir, the pump includes an entry tube and an exit tube, the entry tube extends into the first receiving space of the first reservoir and is located into the mixed fluid of oil and water, the pump drives the mixed fluid of oil and water contained in the first reservoir to be sucked into the pump via the entry tube and be transmitted into the exit tube; a transporting device, including a transporting conduit mechanism, an end of the transporting conduit mechanism provided with an inlet port communicating with the exit tube of the pump and receiving the mixed fluid of oil and water from the exit tube and the other end of the transporting conduit mechanism provided with an outlet port disposed below a fluid surface of the mixed fluid of oil and water and jetting the mixed fluid of oil and water from the inlet port, the outlet port is open upwards when the transporting conduit mechanism is disposed within the first reservoir, the pump driving the mixed fluid of oil and water to transmit to the transporting conduit mechanism via the exit tube, flow into the inlet port and jet out from the outlet port, the mixed fluid of oil and water in the first reservoir jetted out of the fluid surface.

As a result, when the fluid passes through the outlet port, the pump drives the fluid to form a flow jet and jet out with high velocity. The oil floating on the fluid surface is discharged from the reservoir with the flow jet when the fluid is jetted out, and a work of separating the oil and the water is finished.

BRIEF DESCRIPTION OF THE DRAWINGS

FIG. 6 is a perspective drawing of a third embodiment of the present invention in use;

FIG. 7 is a partial perspective drawing of FIG. 6; and

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
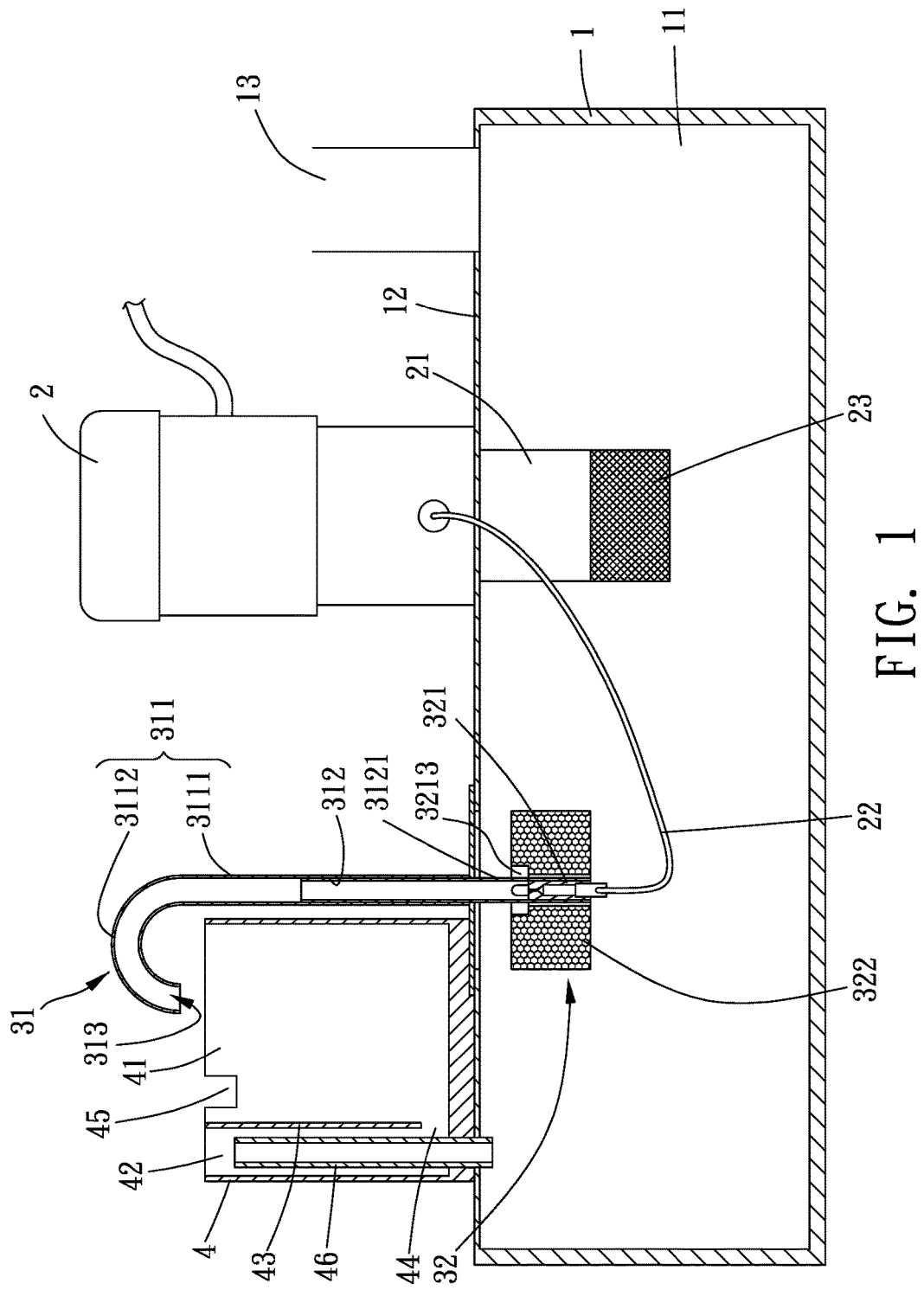
FIG. 1 is a cross-sectional drawing of a preferred embodiment of the present invention.
Figure 2:
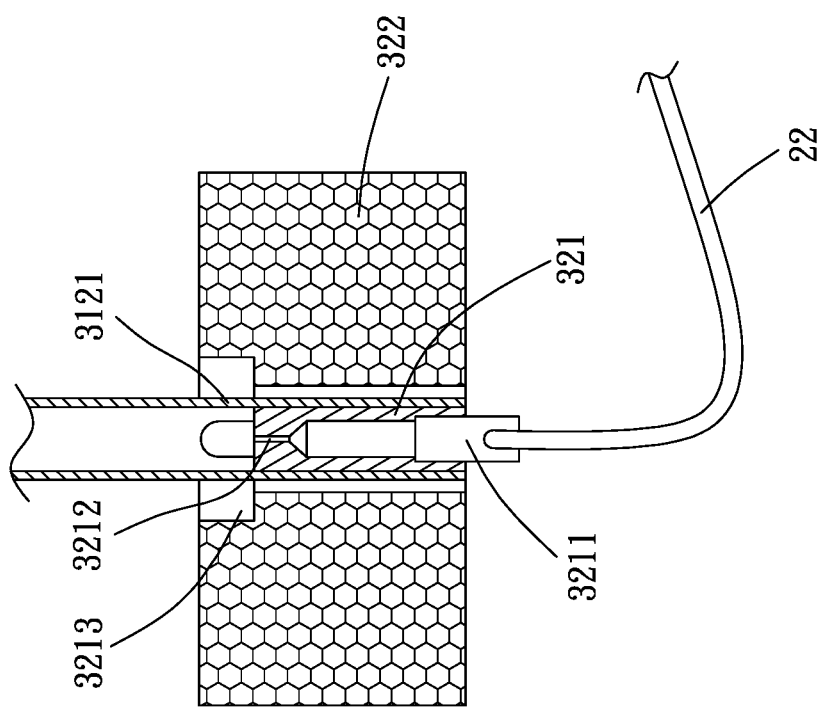
FIG. 2 is a partial cross-sectional drawing of the preferred embodiment of the present invention.

Referring to FIGS. 1-2, an oil and water separating system in accordance with a preferred embodiment of the present invention includes a first reservoir 1, a pump 2, an oil and water separating structure and a second reservoir 4.

The first reservoir 1 has a first receiving space 11. The first reservoir 1 is provided with a base 12 on a top thereof. The first reservoir 1 further includes an entrance 13, and the entrance 13 is for cutting oil (or other fluids) of a working machine to flow therein.

The pump 2 is disposed on the base 12. The pump 2 includes an entry tube 21 and an exit tube 22. The entry tube 21 extends into the first receiving space 11 of the first reservoir 1 and provided with a filter member 23 (the filter member can be a filtering net or other filtering structures).

The oil and water separating structure includes a pipe assembly 31 and a transporting device 32. The pipe assembly 31 includes a first pipe 311 and a second pipe 312. An end of the first pipe 311 is formed with a discharge aperture 313, and the other end and the second pipe 312 are communicating with and slidable relative to each other. Specifically, the first pipe 311 includes a straight portion 3111 and a bending portion 3112. The second pipe 312 is slidably disposed inside the straight portion 3111. A distal end of the bending portion 3112 is formed with the discharge aperture 313; a portion of the second pipe 312 extending downwards and out of the first pipe 311 is a connecting pipe 3121. The connecting pipe 3121 is formed with a plurality of flow holes so that the fluids from outside can flow thereinto; the first pipe 311 is disposed on the base 12. The connecting pipe 3121 of the second pipe 312 penetrates through the base 12 and extends into the first reservoir 1. The transporting device 32 is disposed on the second pipe 312. The transporting device 32 includes a transporting conduit mechanism 321 and a floating structure 322 floatable on a fluid surface. The transporting conduit mechanism 321 is disposed inside the connecting pipe 3121 of the second pipe 312. An end of the transporting conduit mechanism 321 neighboring to an exit of the connecting pipe 3121 is provided with an inlet port 3211 for communicatingly connecting with the pump 2 (the exit tube 22 is communicated with the inlet port 3211 of the transporting conduit mechanism 321), and the other end is provided with an outlet port 3212. Wherein a diameter of the transporting conduit mechanism 321 is taperingly reduced. The inlet port 3211 is greater than the outlet port 3212 in diameter. The outlet port 3212 is formed with an elongated shape. The floating structure 322 can be a floating cylinder, a floating ball or other structures floatable on the fluid surface. The floating structure 322 is connected with the connecting pipe 3121 of the second pipe 312. The connecting pipe 3121 extends into the floating structure 322. The floating structure 322 floats on the fluid surface in the first receiving space 11, and the floating structure 322 is floatably moved by buoyancy of the fluid according to change in level of the fluid surface and drives the second pipe 312 to slide relative to the first pipe 311 up and down. The floating structure 322 is formed with a receiving slot 3213 on a surface neighboring to the flow hole. The receiving slot 3213 is for receiving the fluid so that the fluid can flow into the connecting pipe 3121 via the flow hole of the connecting pipe 3121.

The second reservoir 4 is disposed on the base 12. The second reservoir 4 has a second receiving space 41 and a third receiving space 42, and a top inside the second reservoir 4 is extendingly formed with a block plate 43 downwardly. The block plate 43 separates the second receiving space 41 and the third receiving space 42. A flow channel 44 is formed between the block plate 43 and a bottom of the second reservoir 4. The second receiving space 41 and the third receiving space 42 are communicated with each other through the flow channel 44. The second reservoir 4 is formed with an oil expelling hole 45 neighboring to a top of the second receiving space 41; the discharge aperture 313 corresponds to the second receiving space 41 so that the fluid can flow into the second receiving space 41. In the present embodiment, the discharge aperture 313 is located above the second receiving space 41. The fluid flowing out of the discharge aperture 313 flows into the second receiving space 41 directly via the gravity (in other embodiments, the first pipe can communicatingly extend into the second reservoir directly, and the fluid flowing out of the discharge aperture can also flow into the second receiving space directly); the third receiving space 42 and the first receiving space 11 are communicated with each other. Specifically, the second reservoir 4 includes a recycling pipe 46 which is vertically standing. The recycling pipe 46 is disposed in the third receiving space 42 and penetrates through both the second reservoir 4 and the base 12. The recycling pipe 46 is at least high above the flow channel 44. The recycling pipe 46 is communicated with the third receiving space 42 and the first receiving space 11.

Figure 3:
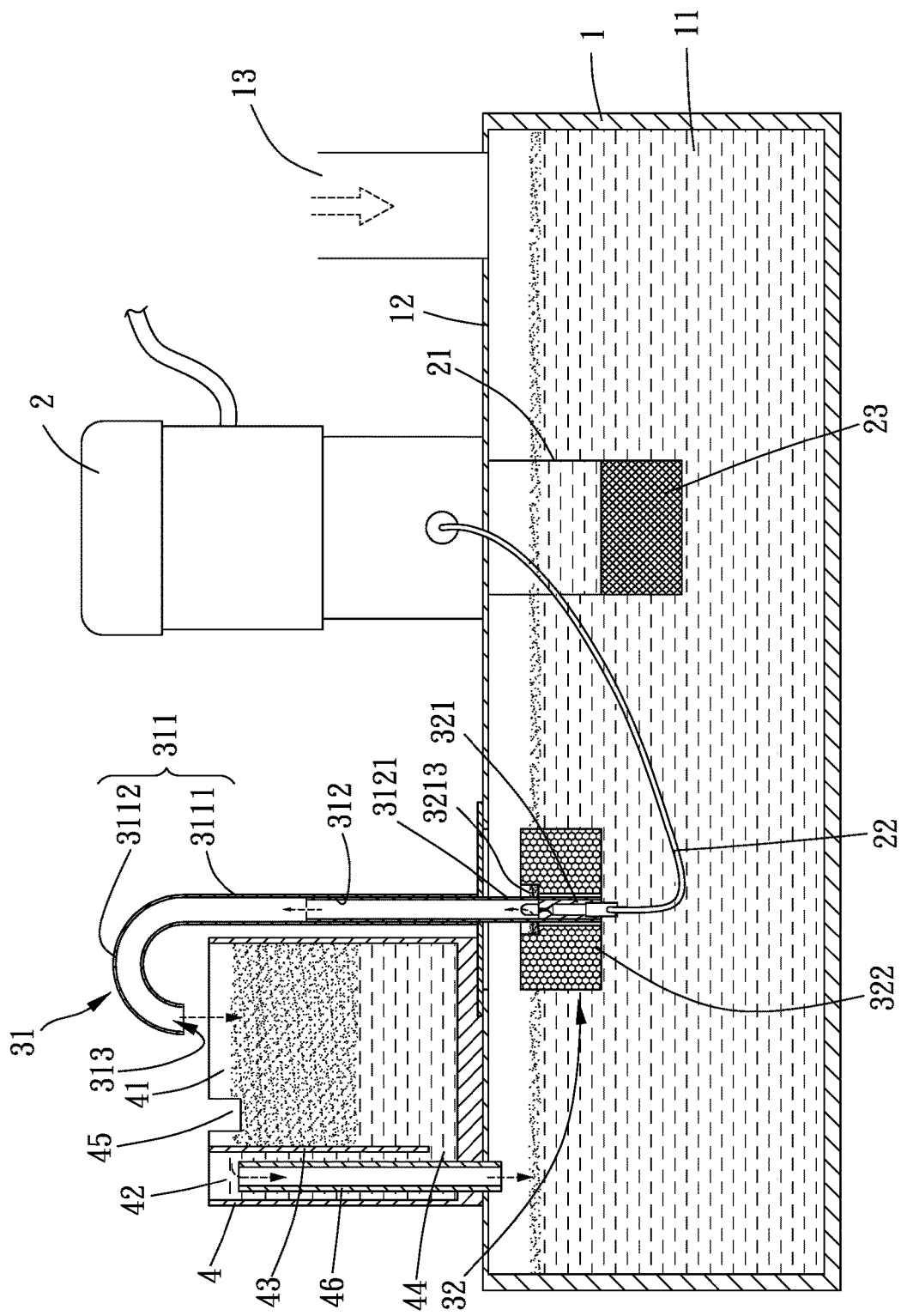
FIGS. 3 and 4 are perspective drawings of the preferred embodiment of the present invention in use.
Figure 4:
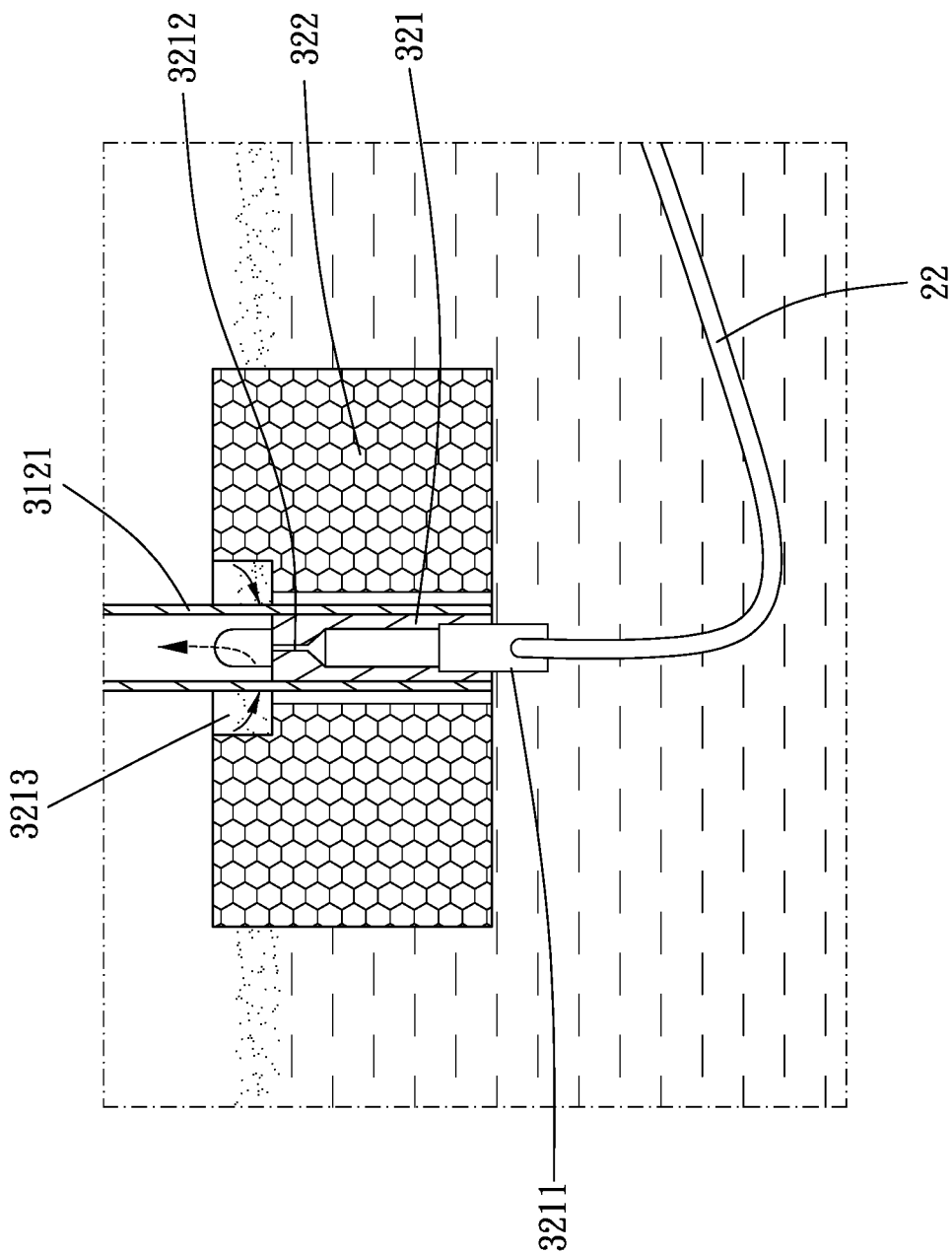

In practical use, please refer to FIGS. 3 and 4, the pump 2 drives the fluid contained in the first reservoir 1 to be sucked into the pump 2 via the entry tube 21 and be transmitted to the transporting conduit mechanism 321 via the exit tube 22, and then the pump 2 drives the fluid to flow into the second pipe 312 through the transporting conduit mechanism 321 and flow out through the discharge aperture 313 of the first pipe 311 so that the fluid flows into the second reservoir 4; specifically, the pump 2 can drive the fluid to jet out from the outlet port 3212, and the fluid can pass through the second pipe 312 and the discharge aperture 313 of the first pipe 311 in regular turn and flow into the second reservoir 4. The oil floating on the fluid surface is discharged through the oil expelling hole 45, and a work of separating the oil and the water is finished.

It is noted that when the fluid flows through the outlet port 3212, a flow velocity of the fluid increases because a diameter of the outlet port 3212 decreases, and a pressure inside the pipe correspondingly decreases (Bernoulli's principle). An internal of the connecting pipe 3121 is formed with a low-pressure suction force, and the fluid is sucked into the connecting pipe 3121 from outside through the flow hole (the fluid inside the receiving slot 3213 or adjacent to the flow hole). The fluid from outside is transmitted to the second reservoir 4 along with the fluid inside the pipe; wherein the fluid from outside which is sucked into the pipe through the flow hole is mostly oil pollution and impurities (the floating structure 322 keeps the flow hole of the connecting pipe 3121 to remain at a height adjacent to the fluid surface) so that the fluid flowing into the second reservoir 4 has a high proportion of the oil. And the second reservoir 4 is convenient for a work of oil expelling. The fluid flowing into the second receiving space 41 of the second reservoir 4, and the water (having a larger specific density than that of the oil) is located below and can flow into the third receiving space 42 via the flow channel 44 and then flow into the first reservoir 1 via the recycling pipe 46.

The present invention uses the pump 2 to drive the fluid to form a jet flow in high flow velocity so as to produce the suction force. The oil floating on the fluid surface is sucked into the pump 2 and discharged into the second reservoir 4. The fluid discharged contains the high proportion of the oil, so it is convenient to deal with the discharged oil. Compared with a prior art which takes lots of time and power, the present invention has a better efficiency in discharging the oil and saves energy. A normal electrical motor is applied and other complicated structures are unnecessary, so it saves cost. Furthermore, the present invention has a simple structure, and it costs low in manufacturing and maintenance. It can be applied in working places with large or small space. A loud noise is avoided in using. It improves disadvantages of the oil and water separating structure of the prior art and has industry value.

It is noted that a sliding structure is designed between the first pipe 311 and the second pipe 312, and when the height of the fluid surface in the first reservoir 1 is changed, the floating structure 322 floats with the height of the fluid surface. The second pipe 312 is driven to slide relative to the first pipe 311, and the flow hole of the connecting pipe 3121 can remain at the height of the fluid surface. It is convenient for a work of sucking the fluid on the fluid surface. The present invention can be applied at different heights of the fluid surface, and it is automatically adjusted with the height of the fluid surface. It is convenient for using.

Furthermore, in other embodiments, a transporting conduit mechanism can be applied directly and individually. An oil and water separating structure in a second embodiment of the present invention (please refer to FIG. 5), for assembling to the pump 2 to use. The pump 2 is disposed in a reservoir including a mixed fluid of oil and water. The pump 2 can be used for transporting the fluid in the reservoir to outside. Wherein the oil and water separating structure includes a transporting device 32. The transporting device 32 includes a transporting conduit mechanism 321. The transporting conduit mechanism 321 is disposed in the reservoir and inclined with an angle. An end of the transporting conduit mechanism 321 is provided with an inlet port for communicatingly connecting with the pump 2, and the other end is provided with an outlet port for disposing below the fluid surface. The pump 2 drives the fluid in the reservoir to flow into the inlet port of the transporting conduit mechanism 321 and flow out from the outlet port so that the fluid with the oil in the reservoir is jetted out of the fluid surface; the oil floating on the fluid surface is also discharged from the reservoir by a jet flow, and the oil is discharged with the fluid and falls into another reservoir. It also achieves a function of separating the oil and the water.

Figure 5:
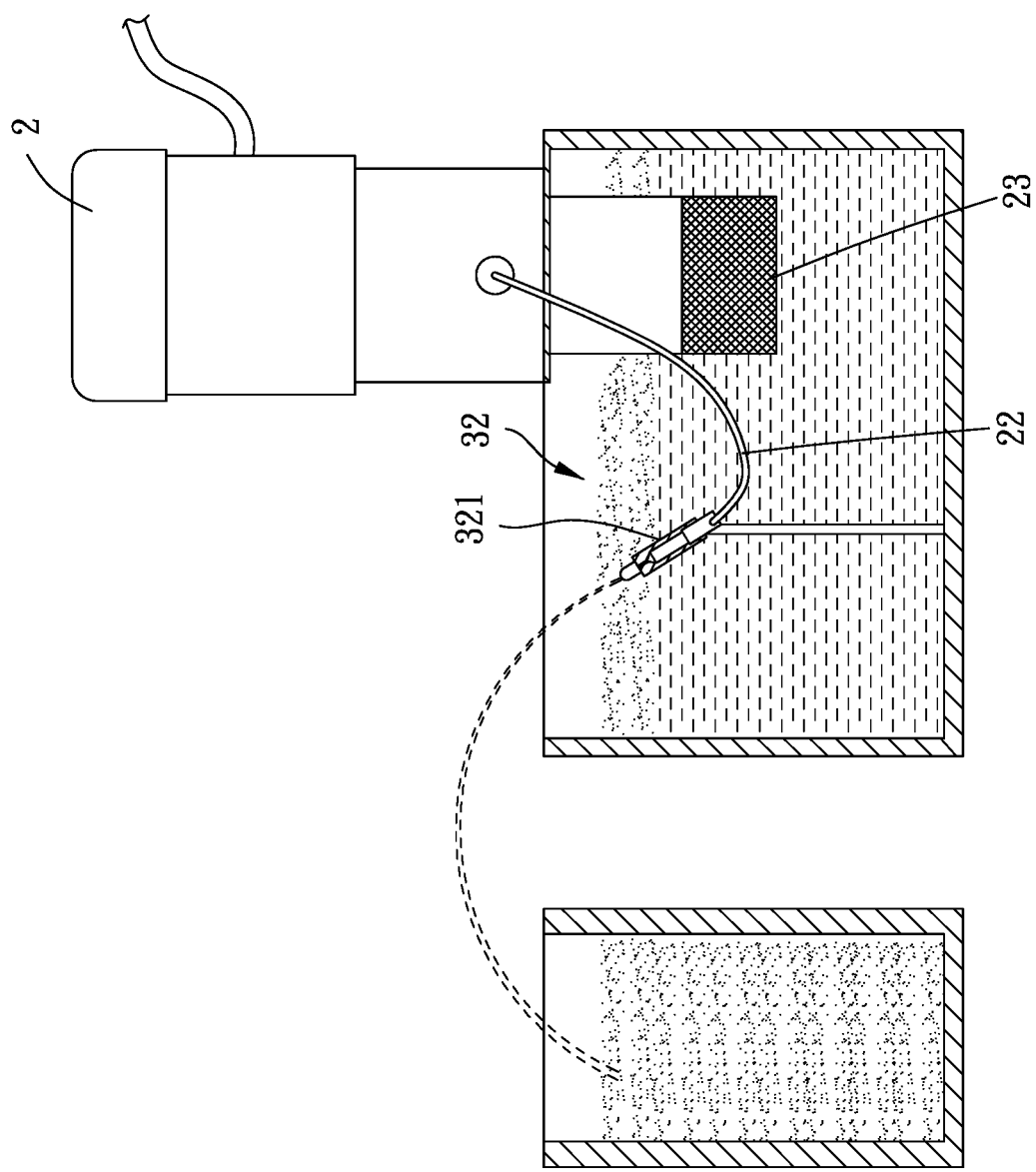
FIG. 5 is a perspective drawing of a second embodiment of the present invention in use.
Figure 8:
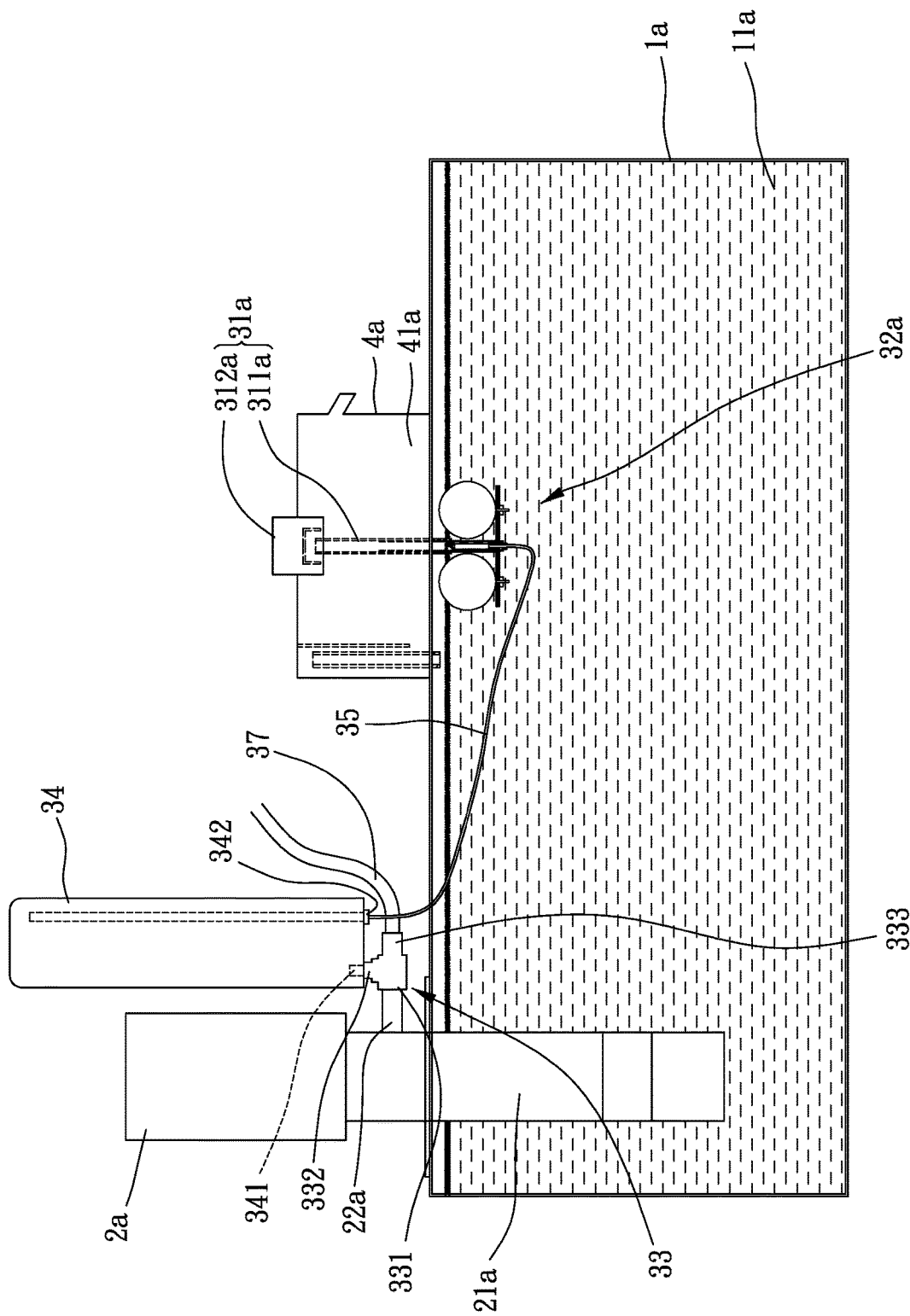
FIGS. 8 to 11 are drawings of an alternative embodiment of the present invention.
Figure 9:
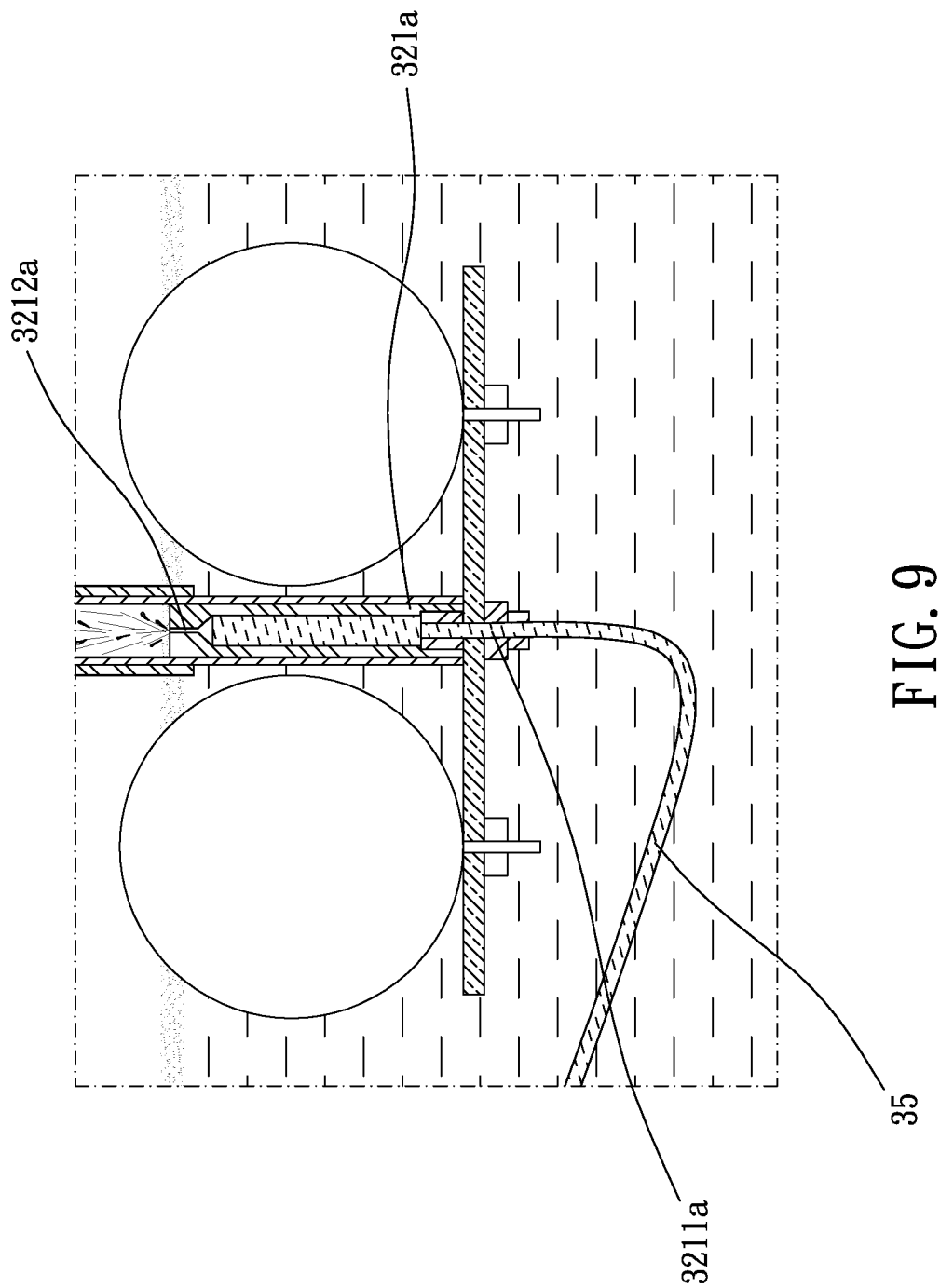
Figure 10:
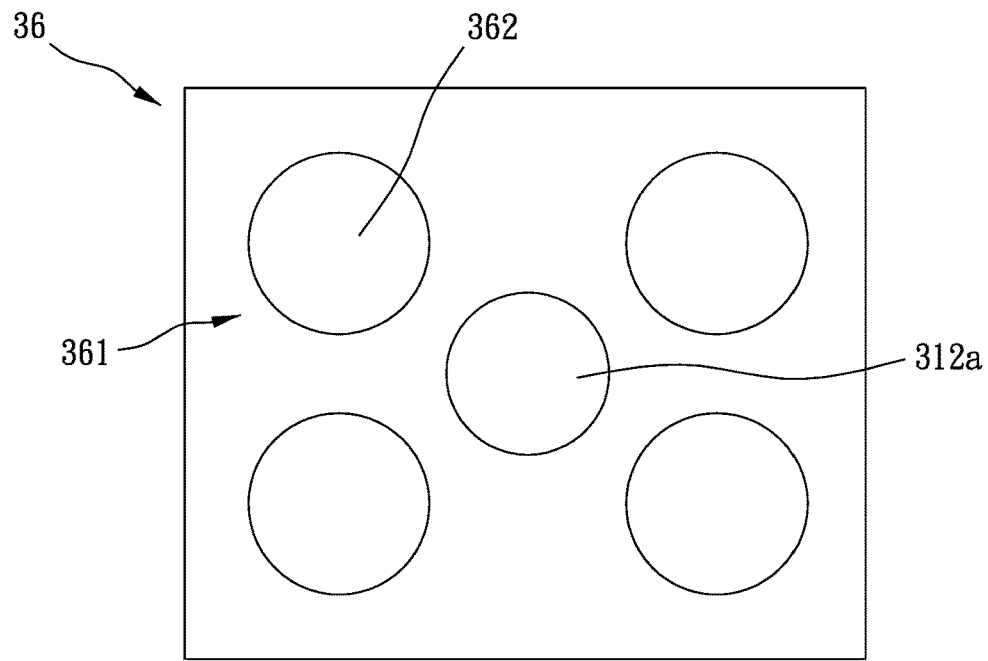
Figure 11:
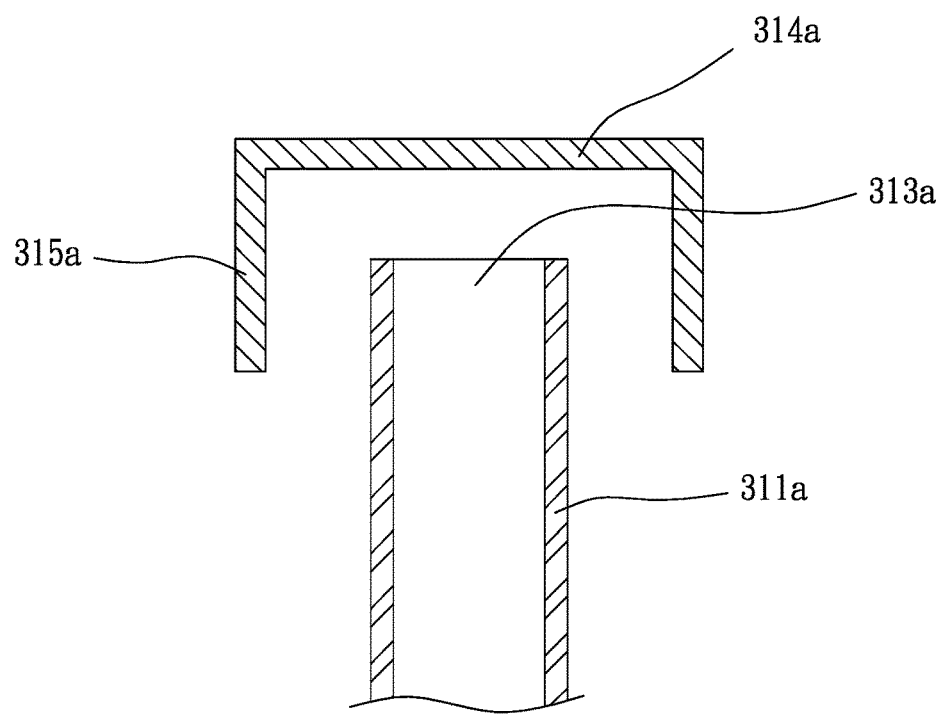

Compared with the embodiment as shown in FIG. 5, a third embodiment as shown in FIGS. 6 and 7, the transporting device further includes a position limiting mechanism 50. At least part of the position limiting mechanism 50 is located in the first receiving space of the first reservoir 1 and connected with the transporting conduit mechanism 321. The position limiting mechanism 50 can limit a position of the transporting conduit mechanism 321. The position limiting mechanism 50 includes a sliding base 51 disposed on a top of the first reservoir 1, a sliding rack 52 slidably disposed on the sliding base 51 and a floating structure 53 connected with an end of the sliding rack 52. The transporting conduit mechanism 321 is connected with the sliding rack 52 and driven by the sliding rack 52. The floating structure 53 is floatable on a fluid surface in the first receiving space. The floating structure 53 is floatably moved by buoyancy of the fluid according to change in level of the fluid surface and drives the sliding rack 52 to slide relative to the sliding base 51 to position the outlet port at a predetermined distance below the fluid surface.

Specifically, the sliding base 51 is provided with a plurality of sliding wheels 511. The sliding rack 52 is provided with a moving rail 521 slidably disposed between the sliding wheels 511 and an arm member 522 laterally connected with the moving rail 521, and the transporting conduit mechanism 321 is connected with an end of the arm member 522. Wherein the moving rail 521 is preferably provided with a weight structure 54 on an end opposite to the floating structure 53 for selectively increasing or reducing weight. The weight structure 54 is such as a weight block and for adjusting a position of the floating structure 53 relative to the fluid surface. The outlet port of the transporting conduit mechanism 321 corresponds to an external pipe 55 communicating with a second reservoir 4, and the fluid with the oil jetted out from the first reservoir 1 is jetted into the external pipe 55 and guided to the second reservoir 4. It is noted that a structure of the second reservoir 4 in the present embodiment can be replaced with the structures as shown in FIGS. 1 and 3.

In an alternative embodiment as shown in FIGS. 8 to 11, the transporting device 32a includes a transporting conduit mechanism 321a, a multi-way connector 33, a filter 34, a communication tube 35 and a second reservoir 4a. An end of the transporting conduit mechanism 321a is provided with an inlet port 3211a and the other end of the transporting conduit mechanism 321a is provided with an outlet port 3212a for being disposed below a fluid surface of the mixed fluid of oil and water. The multi-way connector 33 includes a first port 331, a second port 332 and a third port 333 which communicate with one another. The first port 331 communicates with the pump 2a, the second port 332 communicates with an inlet 341 of the filter 34, the communication tube 35 communicates with the inlet port 3211a of the transporting conduit mechanism 321a and an outlet 342 of the filter 34, and the third port 333 communicates with an outside of the multi-way connector 33. The second reservoir 4a is disposed on the first reservoir 1a and has a second receiving space 41a.

The transporting device 32a further includes a position limiting mechanism 36, at least part of the position limiting mechanism 36 is located in the first receiving space 11a and connected with the transporting conduit mechanism 321a, and the position limiting mechanism 36 is co-movable with the transporting conduit mechanism 321a and for limiting positions of the transporting conduit mechanism 321a. The position limiting mechanism 36 includes a floating structure 361 located in the first receiving space 11a and floatable on the mixed fluid of oil and water.

The transporting device 32a further includes a pipe assembly 31a, and the pipe assembly 31a is connected to the floating structure 361. Specifically, the pipe assembly 31a includes a pipe member 311a connected to the floating structure 361 and a cap member 312a. The transporting conduit mechanism 321a is disposed into a lower end of the pipe member 311a, an upper end of the pipe member 311a has an opening 313a for discharging the mixed fluid of oil and water into the second reservoir 4a, and the cap member 312a is located correspondingly above the second receiving space 41a. The cap member 312a has a top portion 314a facing and being distanced from the opening 313a and an annular wall 315a disposed around the upper end of the pipe member 311a, and there is a discharge channel defined between the cap member 312a and the upper end of the pipe member 311a.

The pump 2a drives the fluid through the multi-way connector 33, the filter 34 and the communication tube 35 to flow into the inlet port 3211a and jet out from the outlet port 3212a so that the fluid with the oil in the first reservoir jetted into the pipe member 311a and blocked by the cap member 312a and so that the fluid with the oil flows downward into the second reservoir 4a.

Specifically, the floating structure 361 includes four floatable ball members 362 arranged in array, and the pipe member 311a is located within an area defined by the four floatable ball members 362.

Preferably, the oil and water separating structure further includes an application tube 37 communicating with the third port 333 and for communicating with an external device which uses the fluid from the multi-way connector 33. Specifically, the transporting conduit mechanism 321a is fixedly connected to the floating structure 361, and the inlet port 3211a and the outlet port 3212a are located in fixed positions relative to the floating structure 361.

Preferably, the pump 2a is fixedly disposed on the first reservoir 1a. The exit tube 22a communicates with the first port 331 of the multi-way connector 33, and the pump 2a driving the fluid contained in the first reservoir 1a to be sucked into the pump 2a via the entry tube 21a and be transmitted into the multi-way connector 33 via the exit tube 22a.

While we have shown and described various embodiments in accordance with the present invention, it should be clear to those skilled in the art that further embodiments may be made without departing from the scope of the present invention.

What is claimed is:

1. An oil and water separating system, including:

a first reservoir, having a first receiving space for containing a mixed fluid of oil and water;

a pump, disposed at least partly in the first receiving space of the first reservoir, wherein the pump is fixedly disposed on the first reservoir and operable to suck the mixed fluid of oil and water from the first reservoir, the pump includes an entry tube and an exit tube, the entry tube extends into the first receiving space of the first reservoir and is located into the mixed fluid of oil and water, the pump drives the mixed fluid of oil and water contained in the first reservoir to be sucked into the pump via the entry tube and be transmitted into the exit tube;

a transporting device, including a transporting conduit mechanism, an end of the transporting conduit mechanism provided with an inlet port communicating with the exit tube of the pump and receiving the mixed fluid of oil and water from the exit tube and the other end of the transporting conduit mechanism provided with an outlet port disposed below a fluid surface of the mixed fluid of oil and water and jetting the mixed fluid of oil and water from the inlet port, the outlet port is open upwards when the transporting conduit mechanism is disposed within the first reservoir, the pump driving the mixed fluid of oil and water to transmit to the transporting conduit mechanism via the exit tube, flow into the inlet port and jet out from the outlet port, the mixed fluid of oil and water in the first reservoir jetted out of the fluid surface; and a second reservoir, disposed on the first reservoir and having a second receiving space;

wherein the transporting device further includes a position limiting mechanism, at least part of the position limiting mechanism is located in the first receiving space and connected with the transporting conduit mechanism, the position limiting mechanism is co-movable with the transporting conduit mechanism, and the position limiting mechanism includes a floating structure located in the first receiving space and floatable on the mixed fluid of oil and water;

wherein the transporting device further includes a pipe assembly, the pipe assembly is connected to the floating structure, the transporting conduit mechanism is disposed into a lower end of the pipe assembly, and an upper end of the pipe assembly has an opening located correspondingly above the second receiving space for discharging the mixed fluid of oil and water into the second reservoir;

wherein the pipe assembly includes a pipe member connected to the floating structure and a cap member, the transporting conduit mechanism is disposed into a lower end of the pipe member, an upper end of the pipe member has the opening, the cap member is located correspondingly above the second receiving space, the cap member has a top portion facing and being distanced from the opening and an annular wall disposed around the upper end of the pipe member, and there is a discharge channel defined between the cap member and the upper end of the pipe member.

2. The oil and water separating system as claimed in claim 1, wherein the floating structure includes four floatable ball members arranged in array, and the pipe member is located within an area defined by the four floatable ball members.

3. The oil and water separating system as claimed in claim 1, wherein the transporting conduit mechanism is fixedly connected to the floating structure, and the inlet port and the outlet port are located in fixed positions relative the floating structure.

* * * * *